(12) United States Patent
Urakawa (10) Patent No.: US 7,529,045 B2
(45) Date of Patent: May 5, 2009

(54) OPTICAL ELEMENT AND OPTICAL APPARATUS HAVING THE OPTICAL ELEMENT

(75) Inventor: Takashi Urakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 11/449,251

(22) Filed: Jun. 8, 2006

(65) Prior Publication Data

US 2006/0280424 A1 Dec. 14, 2006

(30) Foreign Application Priority Data

Jun. 9, 2005 (JP) ............................. 2005-169102

(51) Int. Cl.
G02B 7/02 (2006.01)
(52) U.S. Cl. ...................... 359/819; 359/811
(58) Field of Classification Search ................ 359/811, 359/813, 819, 821–823
See application file for complete search history.

(56) References Cited

U.S. PATENT DOCUMENTS

2006/0139773 A1* 6/2006 Noda et al. ................. 359/819

FOREIGN PATENT DOCUMENTS

| JP | 5-19157 | 1/1993 |
|---|---|---|
| JP | 8-257782 | 10/1996 |
| JP | 11-153742 | 6/1999 |
| WO | 2004/055569 | 7/2004 |

* cited by examiner

Primary Examiner—Scott J Sugarman
Assistant Examiner—Dawayne A Pinkney
(74) Attorney, Agent, or Firm—Locke Lord Bissel & Liddell LLP (57) ABSTRACT

Provided is an optical element with a configuration in which distortion due to fixing thereof on an effective optical portion can be reduced, preferably be eliminated and an apparatus including an optical element. The optical element comprising an effective optical portion on which a light beam is incident, a connecting portion with a holding member which holds the optical element, and a recess portion between the connecting portion and the effective optical portion. It is configured that force effecting on the connecting portion is attenuated by the recess portion then transmits to the effective optical portion. The recess portion is configured in groove shape, and the effective optical portion and the connecting portion can be configured different from each other in thickness.

7 Claims, 8 Drawing Sheets

LIGHT BEAM INCIDENT DIRECTION

FIG. 9

EFFECTIVE OPTICAL SURFACE

LIGHT BEAM INCIDENT DIRECTION

OPTICAL ELEMENT AND OPTICAL APPARATUS HAVING THE OPTICAL ELEMENT

BACKGROUND OF THE INVENTION

1. Field of the Invention

This invention relates an optical element and an optical apparatus having the optical element, and particularly to an optical element having a shape with which distortion occurring to an effective optical portion due to fixing when the optical element is mounted on a casing or the like can be reduced (preferably eliminated), and an optical apparatus having the optical element.

2. Related Background Art

As a method of mounting an optical element on a casing or the like, there has heretofore been fixing by a screw, an adhesive of an ultraviolet curing type or the like, nipping or pressing.

In recent years, with the downsizing of an apparatus, it has often become the case that downsizing is also required of the interval optical element, and the requirement for accuracy has become severer. Due to the downsizing of the optical element, it has become difficult to make a fixing portion large for mounting, while on the other hand, it has become more necessary to reduce the influence of distortion upon an effective optical portion when such a downsized optical element is held and fixed.

So, in International publication No. WO2004/055569A1, disclosed is an optical element comprising an effective optical portion 6 and an optical element holder 1 for fixing and mounting the effective optical portion 6 thereon, and the effective optical portion 6 is provided with one or more slits 8 as distortion stress absorbing means in the end portion thereof in the thickness direction thereof.

Also, the optical element holder 1 is of optical element fixing structure 10 provided with pressing means 3 for pressing at least one of the front surface and rear surface of the effective optical portion 6 outside the slit or slits 8 to thereby fix the effective optical portion 6.

Figure 12:
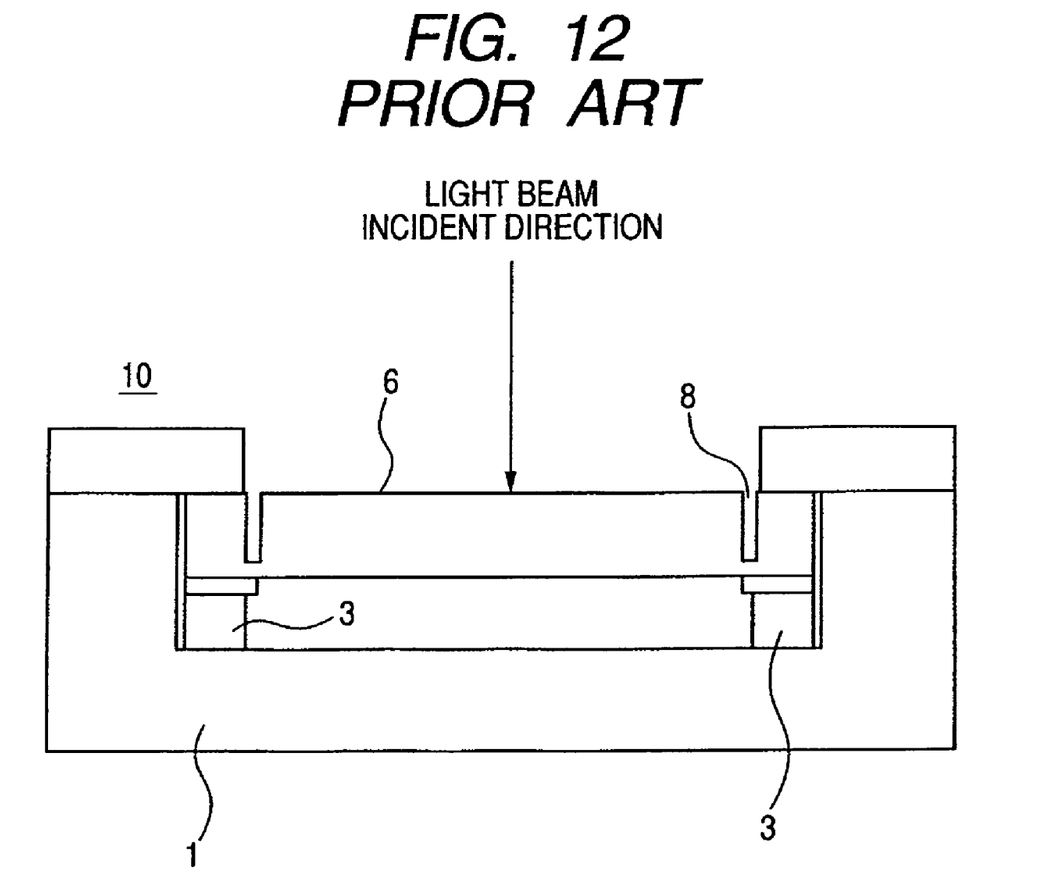
FIG. 12 illustrates an optical element according to the prior art.

That is, International publication No. WO2004/055569A1, as shown in FIG. 12 of the accompanying drawings, proposes means for providing a slit 8 having thickness equal to or greater than a half of the thickness of the optical element to thereby prevent pressure distortion from propagating to the effective optical portion when the effective optical portion 6 is pressed and fixed to the optical element holder 1.

However, in the region wherein the fixing portion and an effective optical portion are connected together, the influence of stress or distortion due to fixing propagates not a little to the effective optical portion. Accordingly, the region in which the fixing portion and the effective optical portion are connected together should desirably be made small to the utmost. Or it is necessary that the distance from the region in which the fixing portion and the effective optical portion are connected together to the effective optical portion be made long. Also, as in the conventional optical element of International publication No. WO2004/055569A1 mentioned above, when provision is made of a slit equal to or greater than a half of the thickness direction, there arises the problem in strength that a crack occurs from the portion (connection portion) in which the slit is formed and causes rupture.

When the thickness of the portion (connection portion) in which the slit is formed is small, there arises the problem that a crack occurs to thereby cause rupture.

That is, the construction of International publication No. WO2004/055569A1 (FIG. 12) cannot realize a construction for keeping the strength in fixing the effective optical portion by the fixing portion and yet, reducing the influence of distortion upon the effective optical portion.

SUMMARY OF THE INVENTION

In view of the above-noted problems, the present invention has as its object to provide an optical element of structure in which it becomes possible to reduce, and preferably eliminate distortion occurring to an effective optical portion due to fixing, and an optical apparatus having the optical element.

According to one aspect of the invention, an optical element comprises an effective optical portion provided with an effective optical surface on which a light beam is incident, and a fixing portion for fixing the effective optical portion, wherein the fixing portion has a portion connected to the effective optical portion, and when viewed from a direction in which the light beam is incident, the portion connected to the effective optical portion is provided with a notched portion extending from the effective optical surface side of the effective optical portion to a rear surface side opposite to the effective optical surface of the effective optical portion.

According to another aspect of the invention, an optical element comprises an effective optical portion provided with an effective optical surface on which a light beam is incident, and a fixing portion for fixing the effective optical portion, wherein the fixing portion has a portion connected to the effective optical portion, and a step is provided between the portion connected to the effective optical portion and the effective optical portion and the portion connected to the effective optical portion is formed with a groove portion having a depth equal to or less than a half of the thickness of the fixing portion.

According to a further aspect of the invention, in the optical element, the effective optical portion has a rotationally asymmetrical surface shape, and the fixing portion has a planar shape, and a step is provided between the portion connected to the effective optical portion and the effective optical portion.

According to a further aspect of the invention, in the optical element, a reflective membrane is provided on the effective optical surface.

According to a further aspect of the invention, in the optical element, the fixing portion is a fixing portion for fixing the optical element by an adhesive.

According to a further aspect of the invention, in the optical element, the notched portion serves also as an escape portion for the adhesive when the optical element is fixed.

According to a further aspect of the invention, in the optical element, the fixing portion is a fixing portion for fixing the optical element by screwing.

According to a further aspect of the invention, the optical element is an optical element manufactured by a molding mold.

According to a further aspect of the invention, in the optical element, the effective optical portion has a rotationally asymmetrical surface shape, and the fixing portion has a planar shape.

According to a further aspect of the invention, an optical apparatus has the optical element set out in the foregoing.

According to the present invention, when the optical element is to be held on a casing or the like, it is possible to reduce distortion occurring to the effective optical portion of the optical element while retaining the holding strong.

DESCRIPTION OF THE PREFERRED EMBODIMENTS

The best form for carrying out the present invention will hereinafter with reference to the following embodiments.

The embodiments of the present invention will hereinafter be described.

Embodiment 1

In Embodiment 1, the present invention is applied to construct an optical element having an optical reflecting surface.

Figure 1:
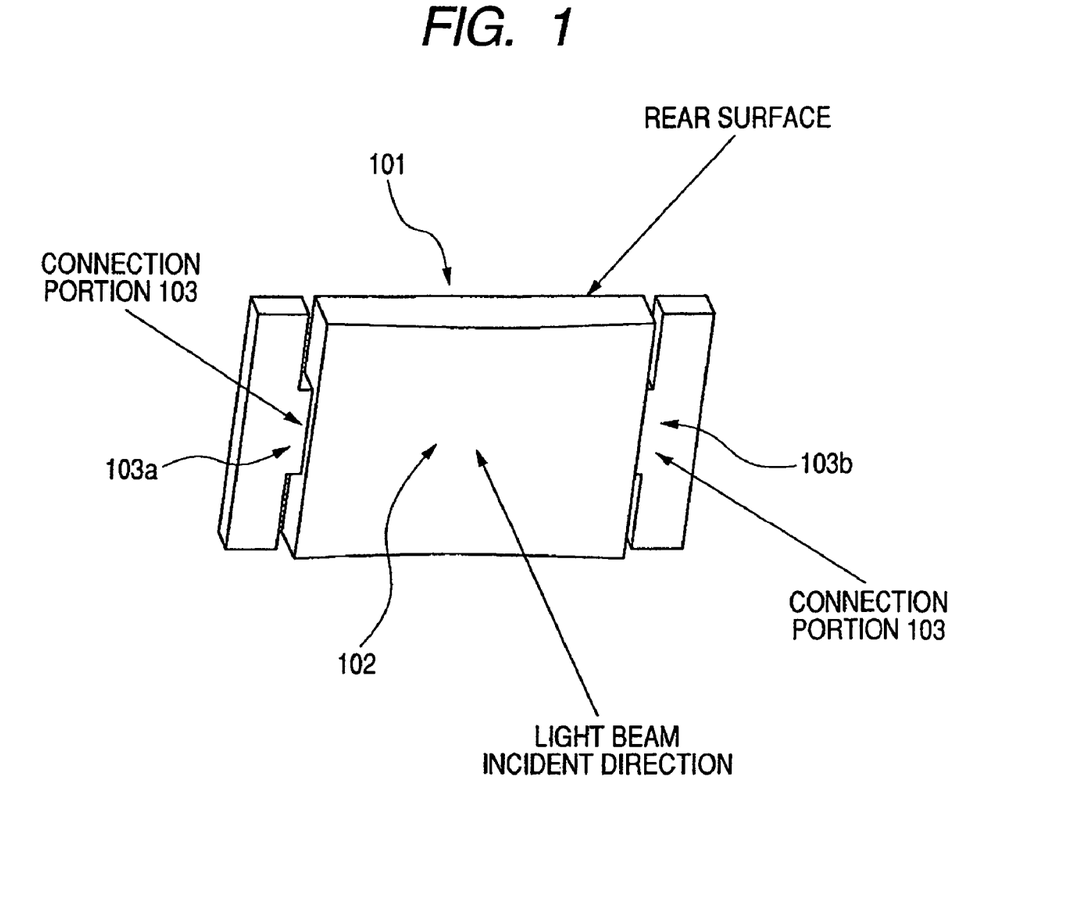
FIG. 1 shows the construction of an optical element according to Embodiment 1 of the present invention.

FIG. 1 is a perspective view showing the construction of the optical element according to the present embodiment.

In FIG. 1, the reference numeral 101 designates the optical element.

The reference numeral 102 denotes an effective optical portion provided with an effective optical surface on which a reflective membrane for reflecting a light beam in the optical element 101 is vapor-deposited, and this effective optical surface is an optical surface on which an effective light beam formed in the effective optical portion in the optical element 101.

The reference characters 103a and 103b designate fixing planar portions 103 (which may be referred to as fixing portions or holding portions, or may be referred to as connecting portions in the sense of portions connected to a holding member for holding this optical element through an adhesive or a screw) for fixing (holding) the optical element 101.

Figure 2A:
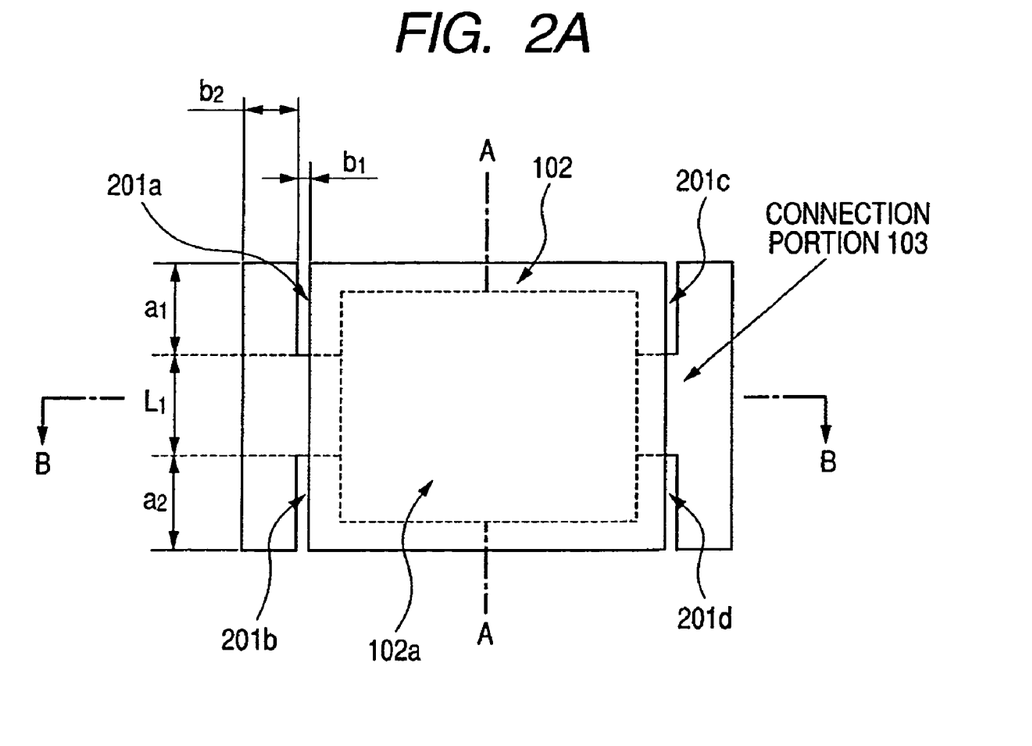
FIG. 2A is a view of the optical element as it is viewed from the effective optical surface side thereof for illustrating Embodiment 1 of the present invention.

FIG. 2A shows the construction of the above-described optical element as it is viewed from the effective optical surface side thereof.

Figure 2B:
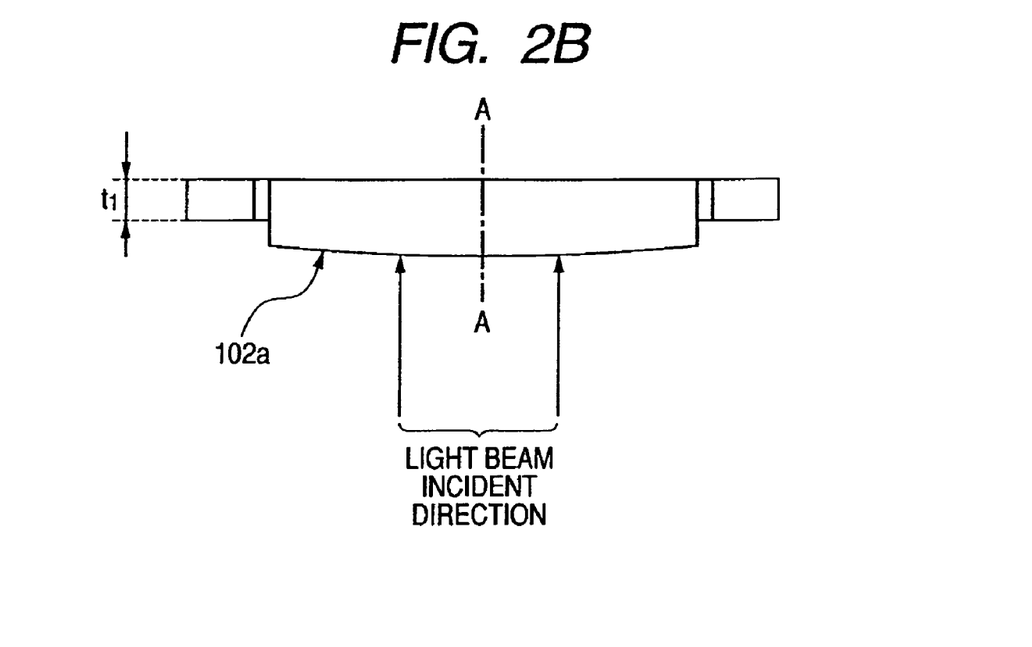
FIG. 2B is a view showing the construction of the cross section B-B of the optical element of FIG. 2A for illustrating Embodiment 1 of the present invention.

FIG. 2B shows the construction of the cross section B-B of the optical element of FIG. 2A.

In the present embodiment, as shown in FIG. 2B, the effective optical surface 102 of the effective optical portion 102 is constituted by a rotationally asymmetrical surface shape, i.e., a so-called free-form surface. Accordingly, in order to constitute the fixing planar portion 103 by a planar surface, a step is provided between the fixing planar portion 103 and the effective optical portion 102 constituted by the free-form surface (effective optical surface 102a), as shown in FIG. 2B.

That is, in the present embodiment, the fixing planar portion 103 has the portions 103 connected to the effective optical portion 102, and adopts a construction in which the area of a first surface facing the fixing planar portion 103 of the effective optical portion 102 is larger than the area of a second surface adhesively secured to the effective optical portion 102 of the connected portion 103.

The area of the first surface is $\{(a1+L1+a2) \times t3\}$ mm$^2$, and the area of the second surface is $(L1 \times t1)$ mm$^2$, when t3 represents the thickness of the effective optical portion. $t1 > t3$ is satisfied.

The optical element according to the present embodiment, as shown in FIG. 2A, is line-symmetrical with respect to the center (line A-A) of the optical element and therefore, about the specific construction, etc. of notched portions extending from the effective optical surface side on which a light beam is incident to the rear surface, description will be made by taking up chiefly the left portion to the plane of the drawing sheet of FIGS. 2A and 2B.

In the present embodiment, four notched portions 201a, 201b, 201c and 201d extending from the effective optical surface side on which the light beam is incident to the rear surface are provided on the effective optical portion 102 side of the fixing planar portion 103, and when observed from the side on which the light beam is incident, a region in which the fixing portion is connected to the effective optical surface is small.

It is to be understood that the shown notch width (the notch width in a direction in which the fixing portion nips the optical element, i.e., the left to right direction in FIG. 2A) b1 is 0.1 mm (preferably 0.5 mm) or greater and 3 mm (preferably 1 mm) or less. By thus setting the notch width of the fixing planar portion, it is possible to reduce (eliminate) distortion occurring to the effective optical portion 102 due to the fixing (holding) of the optical element. By such notched portions 201a, 201b, 201c and 201d extending from the effective optical surface side on which the light beam is incident to the rear surface, a portion of the fixing planar portion functions as a beam portion which directly supports the effective optical portion.

On the basis of the above-described construction, L1, b1 and the thickness t1 of the fixing portion shown in FIG. 2B can be determined so as to have a dynamic characteristic for the beam portion not to rupture. In the present embodiment, setting may preferably be done within such a range that $0.01 \leq b1/L1 \leq 3$ and $0.01 \leq b1/t1 \leq 3$.

While in the present embodiment, the notched portions are indicated as 201a, 201b, 201c and 201d, this construction is not always restrictive, but if the notched portions extend from the effective optical surface side on which the light beam is incident to the rear surface, recesses (notched portions) of another shape may be adapted.

As shown in FIG. 1, in the present embodiment, the thickness of the portion 103 connected to the effective optical portion 102 is made great and the notched portions 201a, 201b, 201c, and 201d are made to extend from the effective optical surface side to the rear surface side, whereby the area of the connecting region between the fixing portion 3 and the effective optical surface 102 is made small and yet, the connection strength of the fixing portion 3 and the effective optical surface 102 is maintained.

However, by providing these recesses (notched portions) extending from the effective optical surface side on which the light beam is incident to the rear surface side, it is desirable to provide a construction which can reduce (preferably eliminate) the deformation amount of the effective optical surface (surface which actually reflects or refracts light) by a force acting on the fixing planar portion as when the fixing planar portion is fixed (such as a force by heat stress or a shock). As a means therefore, it is preferable to separate the position of the effective optical portion from a position at which a force transmitted to the effective optical portion acts (in the present embodiment, on a straight line linking two beam portions together) in order to reduce the transmission ratio of a force acting on the fixing planar portion to the effective optical portion, or to prevent the effective optical surface from being much deformed even if a force acts on the effective optical portion. Here, "to separate the position of the effective optical portion from a position at which a force transmitted to the effective optical portion acts" may desirably be to separate the two positions so as at least not to cross each other, and preferably by 1/50 (preferably 1/10) or more of the distance between one beam portion and the other beam portion.

Description will now be made of a method of fixing the optical element according to the present embodiment.

Figure 3:
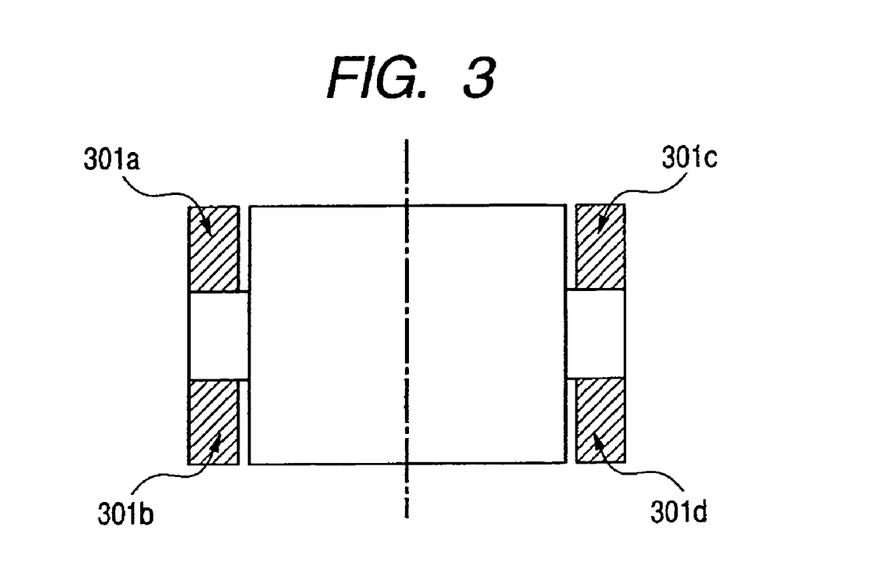
FIG. 3 is an illustration of a method of fixing the optical element according to Embodiment 1 of the present invention.

FIG. 3 shows an illustration of the method of fixing the optical element according to the present embodiment.

As shown in FIG. 3, hatched portions on the sides opposite to the effective optical portion 102 with respect to the notched portions are designated as fixing portions 301a, 301b, 301c and 301d. An adhesive is applied to within the range of these fixing portions 301a, 301b, 301c and 301d to thereby fix the optical element 101 to a casing.

By thus applying the adhesive to within the range of the fixing portions 301a, 301b, 301c and 301d, it is possible to prevent the distortion occurring due to the hardening shrinkage of the adhesive relative to the beam portions connected to the effective optical portion from propagating to the effective optical portion 102 to thereby deform the shape of the effective optical portion and deteriorate optical performance.

The notched portions 201a, 201b, 201c and 201d serve also as escape portions for the adhesive applied too much and therefore, a uniform adhesive layer can be formed.

Also, the adhesively secured area can be made large by making a1 and b2 long, and it becomes possible to enhance adhesively securing strength. Thereby, it becomes possible to determine a1 and b2 in conformity with the required adhesively securing strength, and the shape of the entire optical element can be determined. In the present embodiment, it is preferable to effect setting within such a range that $0.01 \leq b1/b \ 2 \leq 0.1$, $0.1 \leq a1/L1 \leq 10$ and $0.1 \leq a2/L1 \leq 10$.

According to the present embodiment, by the above-described construction, it is possible to reduce the propagation of the distortion occurring due to the hardening shrinkage of the adhesive to the effective optical portion 102, and it becomes possible to make the thickness of the reflecting optical element small. This is particularly useful in an optical element having a rotationally asymmetrical surface shape liable to be affected by the distortion due to fixing. Also, the above-described notched portions can be formed at a time when the effective optical portion is formed in press molding or injection molding, and can be integrally formed without post-working being effected.

While in the present embodiment, the effective optical surface 102a (a surface which actually reflects or refracts light) of the effective optical portion 102 is formed as a free-form surface which is a rotationally asymmetrical surface shape, the effective optical surface may be a planar surface.

Also, as shown in FIG. 2B, the rear surface side of the effective optical portion 102 is shown as a planar surface, but this is not restrictive. A refractive membrane is formed on the effective optical surface of the effective optical portion 102, but a reflective membrane may also be formed on the fixing portions 103a and 103b.

While in the present embodiment, the notched portions 201a, 201b, 201c and 201d serve also as the escape portions for the adhesive, provision may be made of notched portions or groove portions discrete from the notched portions 201a, 201b, 201c and 201d for preventing the distortion due to fixing from being propagated to the effective optical portion 102.

Also, the notched portions 201a, 201b, 201c and 201d extending from the effective optical surface side on which the light beam is incident to the rear surface need not always be provided at four locations. Further, while in the present embodiment, the lengths of the notch amounts a1 and a2 are made equal to each other, this is not restrictive, but they may be unequal to each other, and need not be bilaterally symmetrical with respect to the center, but the lengths of all the notch amounts may be changed.

Embodiment 2

In Embodiment 2, the present invention was applied to construct an optical element of different configuration from that of Embodiment 1.

Figure 4:
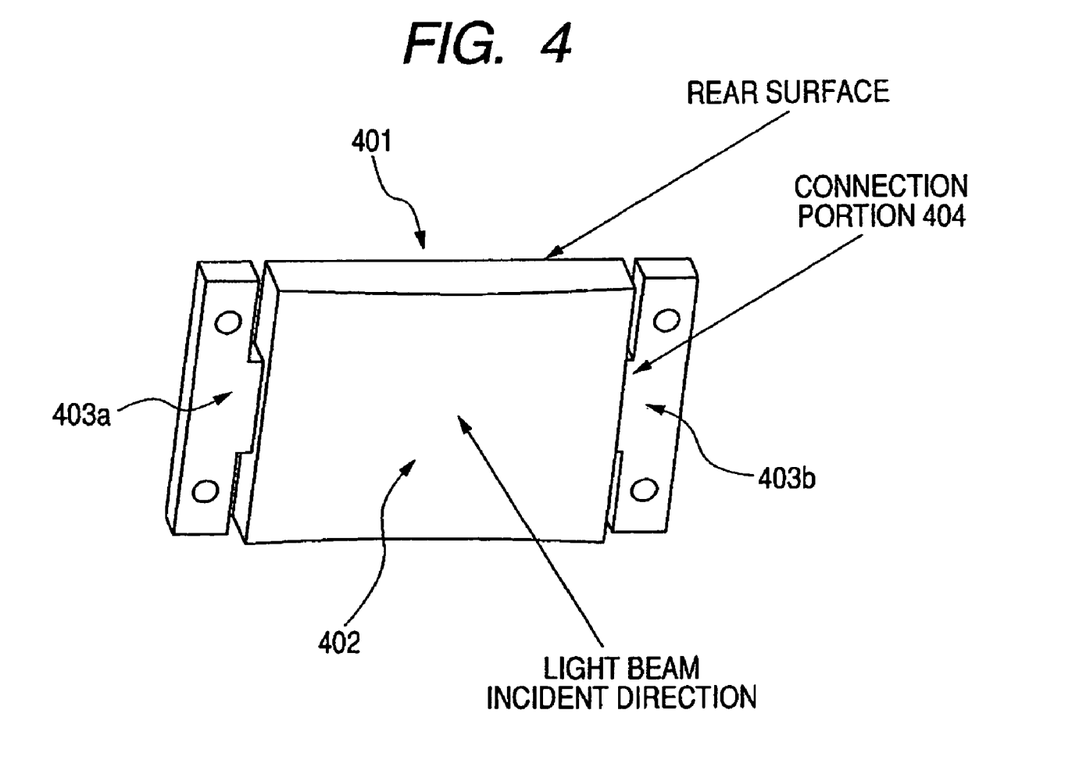
FIG. 4 shows the construction of an optical element according to Embodiment 2 of the present invention.

FIG. 4 is a perspective view showing the construction of the optical element according to the present embodiment.

In FIG. 4, the reference numeral 401 designates the optical element.

The reference numeral 402 denotes an effective optical portion provided with an effective optical surface on which a reflective membrane for reflecting a light beam in the optical element 401 is vapor-deposited. The effective optical surface is an optical surface on which an effective light beam formed in the effective optical portion in the optical element 401 is incident.

The reference characters 403a and 403b designate fixing planar portions for fixing the optical element 401.

Figure 5A:
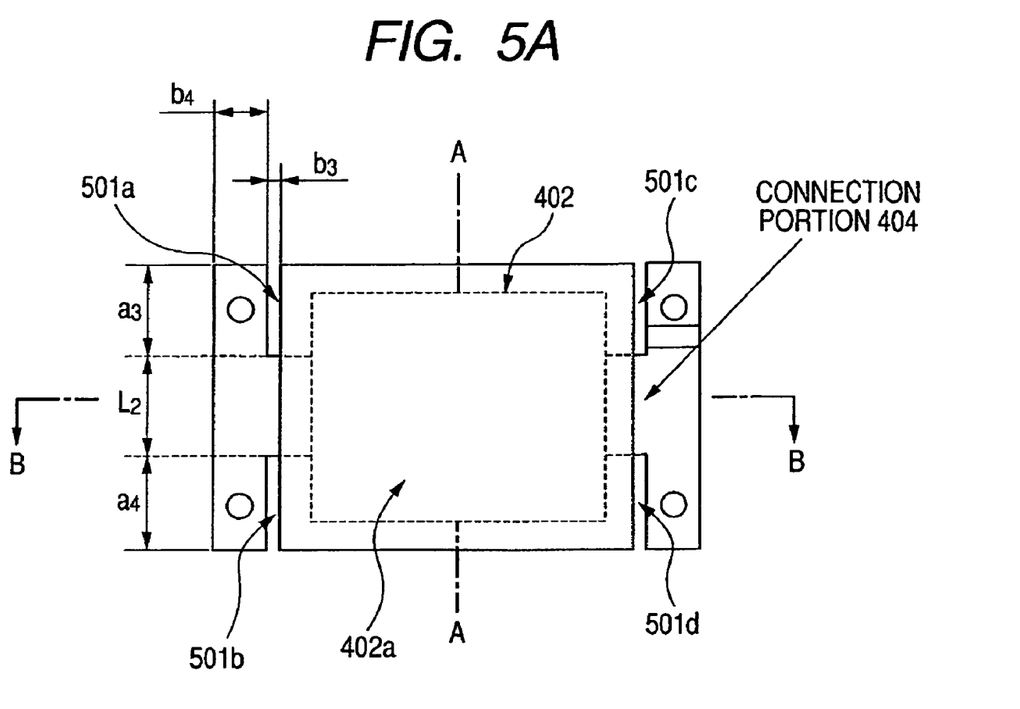
FIG. 5A is a view of the optical element as it is viewed from the effective optical surface side thereof for illustrating.

FIG. 5A shows the construction of the above-described optical element as it is viewed from the effective optical surface side thereof.

Figure 5B:
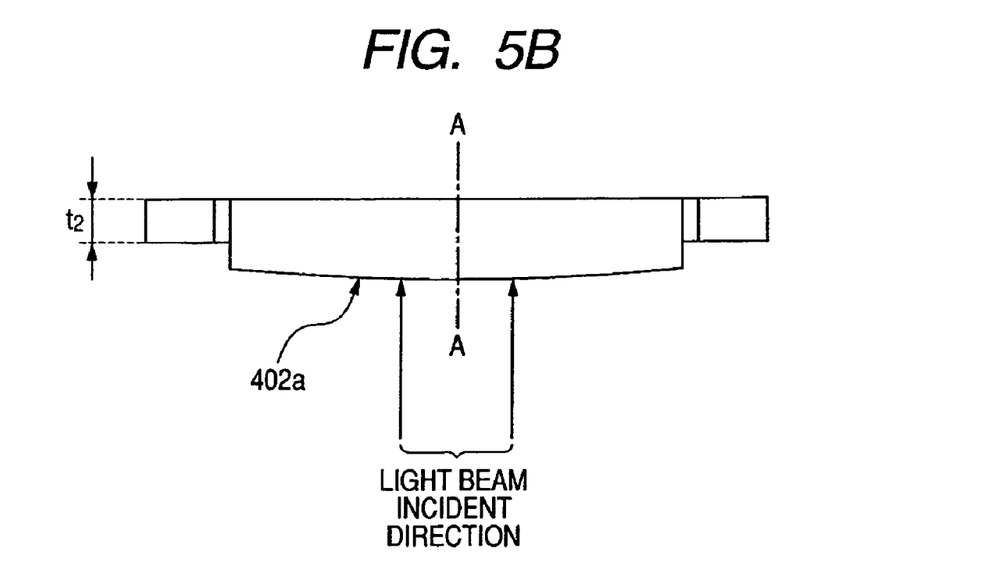
FIG. 5B is a view showing the construction of the cross section B-B of the optical element of FIG. 5A for illustrating Embodiment 2 of the present invention.

FIG. 5B shows the construction of the cross section B-B of the optical element of FIG. 5A.

In the present embodiment, as shown in FIG. 5B, the effective optical surface 402a (a surface which actually reflects or refracts light) of the effective optical portion 402 is constituted by a rotationally asymmetrical surface shape, i.e., a so-called free-form surface. Accordingly, in order to constitute the fixing planar portions 403a and 403b by planar surfaces, a step is provided between the fixing planar portions 403a and 403b and the effective optical portion 402 constituted by the free-form surface (effective optical surface), as shown in FIG. 5B.

The optical element according to the present embodiment, as shown in FIG. 5A, is line-symmetrical with respect to the center (line A-A) of the optical element and therefore, the specific construction, etc. of the notched portions extending from the effective optical surface side on which a light beam is incident to the rear surface will be described by taking up chiefly the left portion to the plane of the drawing sheet of FIGS. 5A and 5B. In the present embodiment, it is preferable to effect setting within such a range that $0.01 \leq b1/L1 \leq 3$ and $0.01 \leq b1/t1 \leq 3$.

Notched portions 501a, 501b, 501c and 501d extending from the effective optical surface side on which the light beam is incident to the rear surface are provided at four locations in the boundary region between the fixing planar portions 403a and 403b and the effective optical portion 402. By these notches, the region divided into the fixing portion and the effective optical portion and portions indicated by L2 perform the role of a beam connecting the effective optical portion and the fixing portion together. Accordingly, L2 and b3 and the thickness t2 of the fixing portion indicated in FIG. 5B can be determined so that this beam portion may have a dynamic characteristic for being not ruptured.

Description will now be made of a method of fixing the optical element according to the present embodiment.

Figure 6:
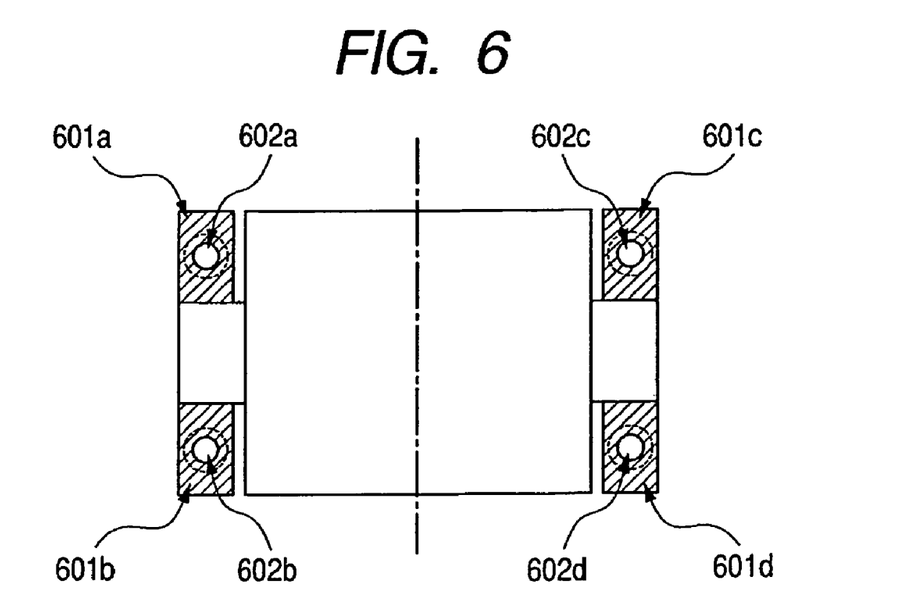
FIG. 6 is an illustration of a method of fixing the optical element according to Embodiment 2 of the present invention.

FIG. 6 shows an illustration of the method of fixing the optical element according to the present embodiment.

As shown in FIG. 6, hatched portions on the sides opposite to the effective optical portion 402 with respect to the notched portions extending from the effective optical surface side on which the light beam is incident to the opposite rear surface side are designated by fixing portions 601a, 601b, 601c and 601d. The fixing portions 601a, 601b, 601c and 601d are formed with screw holes 602a, 602b, 602c and 602d. The screw holes 602a, 602b, 602c and 602d need not always be provided in the respective fixing portions 601a, 601b, 601c and 601d. The projection line of the head of a screw is indicated by a dotted line in FIG. 6. If the head of the screw reaches the beam portion, the fixing distortion due to screwing propagates to the effective optical portion 402 and therefore, the position for screwing is determined so that the head of the screw indicated by the dotted line may come into the fixing portion 601a, 601b, 601c and 601d, and the optical element is fixed to a casing.

Figure 7:
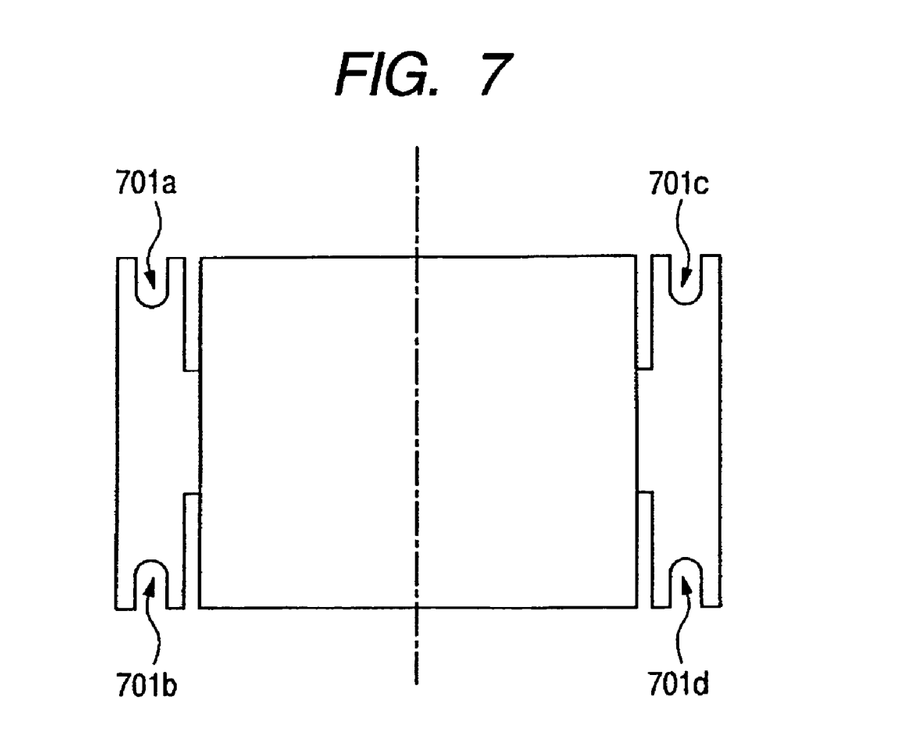
FIG. 7 shows another form of the shape of a screw hole in Embodiment 2 of the present invention.

The head of the screws are fixed in such a manner as to come into the range of the fixing portions 601a, 601b, 601c and 601d, whereby it is possible to prevent distortion occurring due to the screwing to the beam portion connected to the effective optical portion from propagating to the effective optical surface 402a of the effective optical portion 402 to thereby deform the shape of the effective optical portion and deteriorate optical performance. The shape of the screw holes 602a, 602b, 602c and 602d is not restricted to the shown shape, but may be such notch shapes 701a, 701b, 701c and 701d as shown in FIG. 7, or a semicircular shape, not shown. Thus, it becomes possible to determine necessary notch amounts a3 and a4, and the shape of the entire optical element can be determined. In the present embodiment, it is preferable to effect setting within such a range that $0.01 \leq b1/b\ 2 \leq 0.1$, $0.1 \leq a1/L1 \leq 10$ and $0.1 \leq a2/L1 \leq 10$. According to the present embodiment, by the above-described construction, it is possible to reduce the propagation of the distortion occurring due to the fixing of the screws to the effective optical surface of the effective optical portion 402.

While in the present embodiment, the effective optical surface of the effective optical portion 402 is a free-form surface which is a rotationally asymmetrical surface shape, the effective optical surface 402a of the effective optical portion 402 may be a planar surface, and when the effective optical surface of the effective optical portion 402 is a planar surface, the fixing planar portions 403a and 403b may be in the same plane as the effective optical portion 402.

Also, while the rear surface side of the effective optical portion 402 is shown as a planar surface in FIG. 5B, this is not restrictive. A reflective membrane is formed on the effective optical surface of the effective optical portion 402, but it may also be formed on the fixing portions 403a and 403b.

While in the present embodiment, the notched portions 501a, 501b, 501c and 501d extending from the effective optical surface side on which the light beam is incident to the rear surface on the opposite side are at four locations, this is not restrictive. Further, while in the present embodiment, the lengths of the notch amounts a3 and a4 are made equal to each other, they may be unequal to each other, or need not be bilaterally symmetrical with respect to the center and the lengths of all the notch amounts may be changed.

As shown in FIGS. 5A and 5B, in the present embodiment, the thickness of a portion 404 connected to the effective optical portion 402 is made large, and the notched portions 501a, 501b, 501c and 501d are made to extend from the effective optical surface side to the rear surface side, whereby the area of the connecting region between the fixing portions 403a and 403b and the effective optical surface 402 is made small and yet, the connection strength of the fixing portions 403a and 403b and the effective optical surface 402 is maintained.

Embodiment 3

In Embodiment 3, the present invention was applied to construct an optical element of different configuration from that of each of the above-described embodiments.

Figure 8:
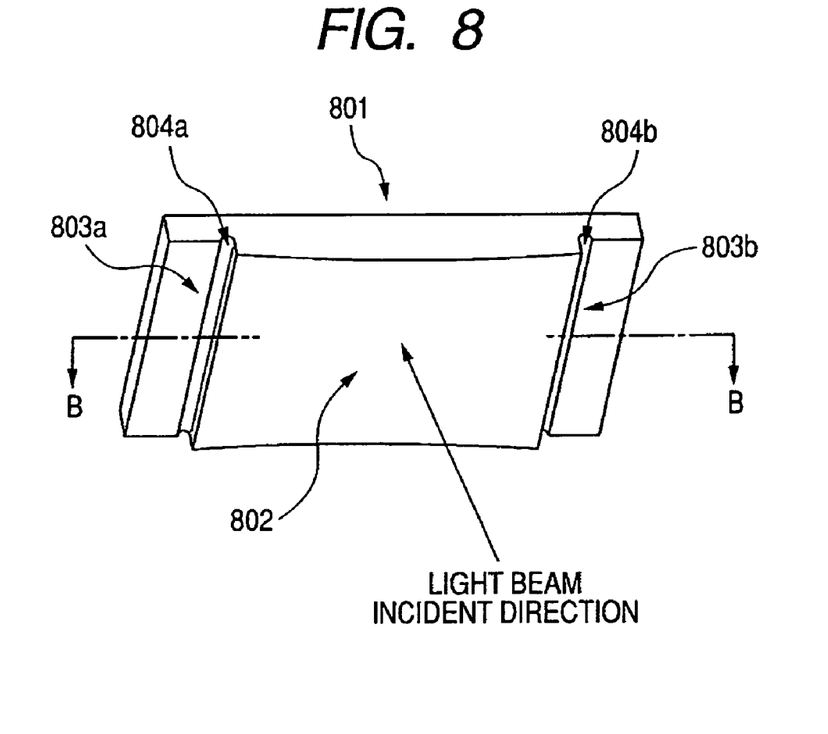
FIG. 8 shows the construction of an optical element according to Embodiment 3 of the present invention.

FIG. 8 is a perspective view showing the construction of the optical element according to the present embodiment.

Figure 9:
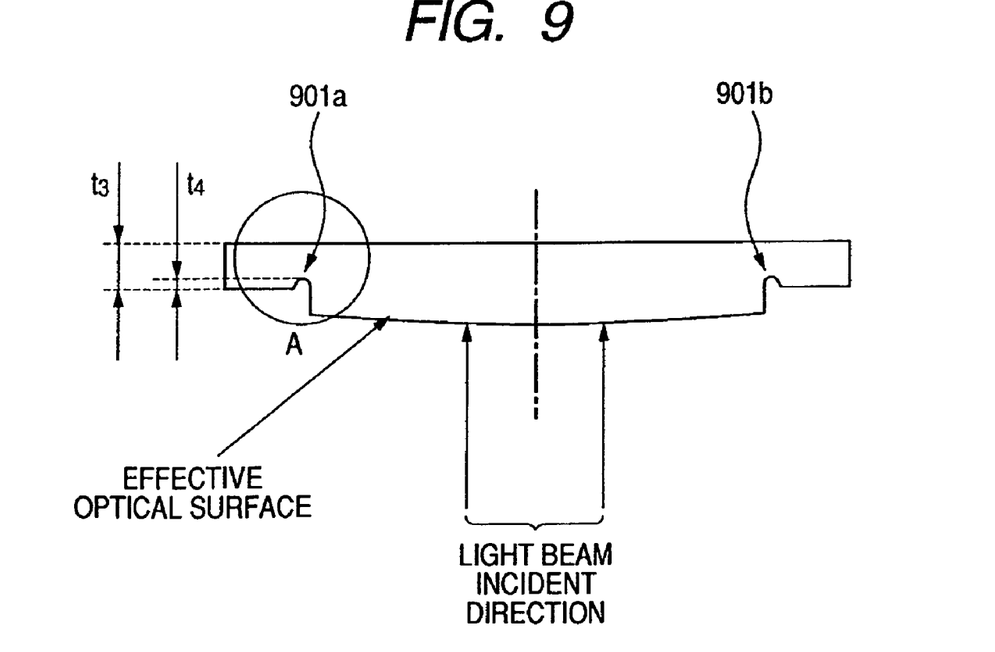
FIG. 9 shows the construction of the cross section B-B of the optical element of FIG. 8 according to Embodiment 3 of the present invention.

FIG. 9 shows the construction of the cross sections B-B of the optical element of FIG. 8.

In FIG. 8, the reference numeral 801 designates the optical element.

The reference numeral 802 denotes an effective optical portion provided with an effective optical surface on which a reflective membrane for reflecting a light beam in the optical element 801 is vapor-deposited.

The reference characters 803a and 803b designate fixing planar portions for fixing the optical element 801. In the present embodiment, as shown in FIG. 9, the effective optical surface 802a (a surface which actually reflects or refracts light) of the effective optical portion 802 is constituted by a rotationally asymmetrical surface shape, i.e., a so-called free-form surface. Accordingly, in order to constitute the fixing planar portions 803a and 803b by planar surfaces, a step is provided between the fixing planar portions 803 and the effective optical portion 802 constituted by the free-form surface (effective optical surface), as shown in FIG. 9.

Groove portions 804a and 804b are provided at the left and right, respectively, in a region wherein the step is provided between the effective optical portion 802 and the fixing planar portions 803a and 803b.

As shown in FIG. 9, the region is divided into the fixing portion and the effective optical portion by these groove portions 804a and 804b, and the groove portions 804a and 804b perform the role of beams 901a and 901b connecting the effective optical portion and the fixing portions together.

Accordingly, as shown in FIG. 9, the dig amount t4 of the groove portions 804a and 804b can determine the thickness t3 of the fixing portion and the dig amount t4 so as to have a dynamic characteristic for these beams 901a and 901b not to rupture.

In the present embodiment, a step is provided between the effective optical portion 802 and the fixing planar portions 803a and 803b and therefore, without the dig amount t4 being made equal to or greater than a half of the thickness t3 of the fixing planar portions 803a and 803b as in the prior art, the distance from the effective optical portion 802 to the vertex portion of the groove portions 804a and 804b can be made long. Accordingly, in the present embodiment, it becomes possible to prevent the distortion due to fixing from propagating to the effective optical portion 802 by making the dig amount t4 less than a half of the thickness t3 of the fixing planar portion.

Also, in a case where the optical element 801 is manufactured by a molding mold, if the dig amount t4 is made equal to or greater than a half of the thickness t3 of the fixing planar portions 803a and 803b, the flow of a molding material will be made bad, however in the present embodiment, as described above, the dig amount t4 can be made small, and therefore the present embodiment is also advantageous in this point. Also, a construction in which as in the present embodiment, a step is provided between the effective optical portion 802 and the fixing planar portions 803a and 803b is advantageous in that even when the adhesive protrudes, it is made difficult to be affected thereby.

Description will now be made of a method of fixing the optical element according to the present invention.

Figure 10:
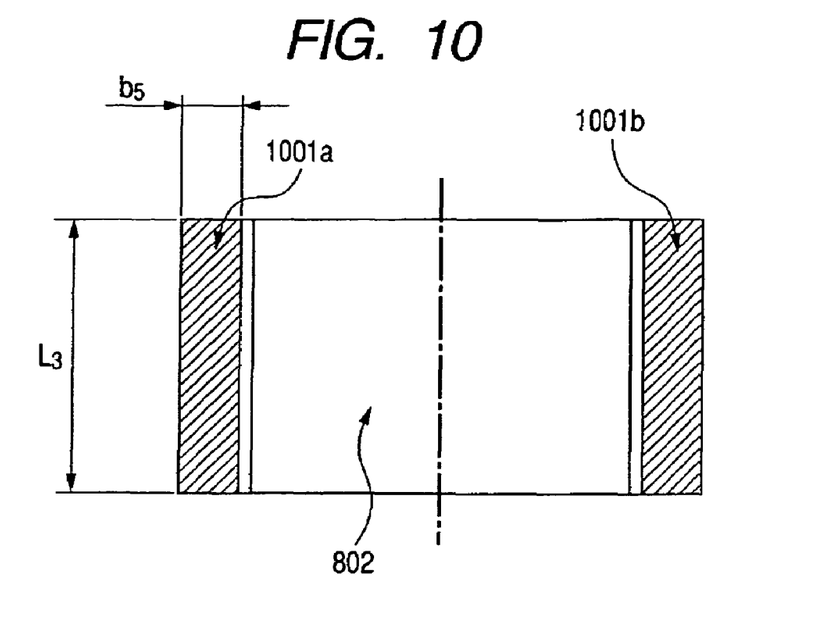
FIG. 10 is an illustration of a method of fixing the optical element according to Embodiment 3 of the present invention.

FIG. 10 shows an illustration of the method of fixing the optical element according to the present embodiment.

As indicated by hatchings in FIG. 10, the fixing planar portions 803a and 803b on the side opposite to the effective optical portion 802 with respect to the groove portions 804a and 804b are defined as fixing portions 1001a and 1001b. The adhesive is applied to within the range of the fixing portions 1001a and 1001b to thereby fix the optical element 801 to a casing.

By applying the adhesive to within the range of the fixing portions 1001a and 1001b, it is possible to prevent the distortion occurring due to the hardening shrinkage of the adhesive relative to the beam portion connected to the effective optical portion from propagating to the effective optical portion 802 to thereby deform the shape of the effective optical portion and deteriorate optical performance.

The groove portions 804a and 804b serve also as escape portions for the adhesive applied too much and therefore, a uniform adhesive layer can be formed. Discretely from the groove portions, another groove portion may be provided as an escape portion for the adhesive.

Also, it is possible to make the adhesively securing area large and therefore enhance the adhesively securing strength by making L3 and b5 long and thus, it becomes possible to determine L3 and b5 in conformity with desired adhesively securing strength, and the shape of the entire optical element can be determined.

Figure 11A:
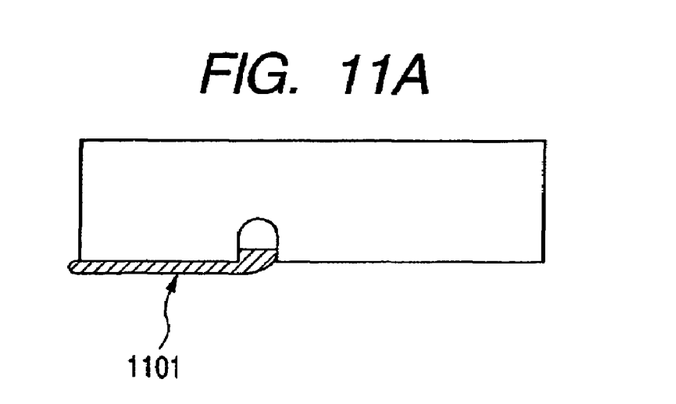
FIGS. 11A and 11B are views illustrating the necessity of providing a step between an effective optical portion and a fixing planar portion in Embodiment 3 of the present invention.
Figure 11B:
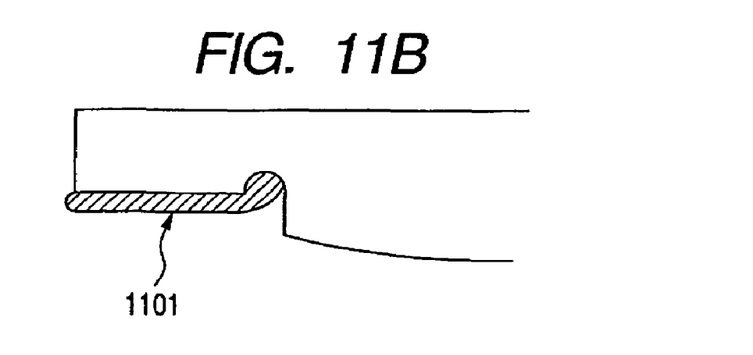

Reference is now had to FIGS. 11A and 11B to describe other reason for the necessity of providing a step between the effective optical portion 802 and the fixing planar portions 803a and 803b when the optical element is adhesively fixed.

If as shown in FIG. 11A, there is no step between the effective optical portion 802 and the fixing planar portions 803a and 803b, an adhesive 1101 will protrude from the groove portions and adhere to the vicinity of the effective optical portion 802, and there will arise the possibility that the distortion due to the hardening shrinkage of the adhesive 1101 may influence the effective optical portion 802. However, by providing a step between the effective optical portion 802 and the fixing planar portions 803a and 803b as shown in FIG. 11B, the adhesive 1101 having crossed the groove portions 804a and 804b adheres to the lower portion of a region in which the effective optical portion 802 exists, and the possibility of affecting the effective optical portion becomes low.

According to the present embodiment, by the above-described construction, the propagation of the distortion due to fixing such as the hardening shrinkage of the adhesive to the effective optical portion 802 can be reduced. Also, it is possible to form the above-described groove portions at a time when the effective optical portion is formed in press molding or injection molding, and the groove portions can be integrally made without post-working being effected.

While in the present embodiment, there has been shown in FIG. 9 a construction in which the rear surface side of the effective optical portion 802 is a planar surface, the present invention is not restricted to such a construction.

Also, a reflective membrane is formed on the effective optical portion 802, but it may also be formed on the fixing planar portions 803a and 803b.

Also, in the present embodiment, the groove portions 804a and 804b are of a semicircular shape, but may be of other shape such as a rectangular shape, and a tapered portion may be provided to pull out a molding mold.

Also, the groove portions 804a and 804b serve also as escape portions for the adhesive, but provision may be made of notched portions or groove portions discrete from the groove portions 804a and 804b in order to prevent the distortion due to fixing from propagating to the effective optical portion 802.

Further, while the groove portions 804a and 804b cross all of the space between the fixing portions and the effective optical portion, this is not restrictive, but the groove portions may intermittently cross the effective optical portion or the lengths of all notch amounts may be changed in left-and-right asymmetry.

While the embodiments of the optical elements have been described above, the optical element according to the present embodiment may be a reflection type optical element (mirror) or may be a transmission type optical element (e.g. a lens or a diffractive optical element having refractive power), or may be a dichroic mirror, a polarized beam splitter, a wavelength plate, a polarizing plate or the like.

Also, the optical element according to the present embodiment can be applied to various optical apparatuses. As optical apparatuses using the optical element according to the present embodiment, there are conceivable, for example, an image pickup lens (interchangeable lens), an image pickup apparatus (camera), a head mount display (spectacles type image display apparatus), a projector (such as a light crystal projector), etc. Of course, it may be applied to other optical apparatuses than the optical apparatuses mentioned above.

The optical element to which the present embodiment is applied enables the deformation of the effective optical portion to be made small (preferably eliminated) and therefore, should desirably be applied at a position where surface accuracy is particularly high. When applied, for example, to a projector or the like which effects light modulation by a liquid crystal panel (image display element) or the like, the optical element should preferably be disposed at a stage subsequent to the liquid crystal panel. When applied to a projector or the like which controls light emission by a light source and effects light modulation, and scans with the light by the use of a scanning optical system, the optical element should preferably be disposed behind the scanning optical system.

Also, the various embodiments described herein may be arbitrarily combined together for use.

This application claims priority from Japanese Patent Application No. 2005-169102 filed on Jun. 9, 2005, which is hereby incorporated by reference herein.

What is claimed is:

1. An optical element, comprising:
   an effective optical portion provided with an effective optical surface on which a light beam is incident;
   a fixing portion for fixing the effective optical portion, wherein the fixing portion has a portion that projects outwardly from the fixing portion connected to the effective optical portion,
   wherein the thickness of the entire fixing portion, as well as the thickness of the portion that projects outwardly form the fixing portion, is less than the thickness of the effective optical portion,
   wherein a gap exists between the fixing portion and the effective optical portion both above and below the portion that projects outwardly from the fixing portion, such that light in the direction incident to the effective optical portion proceeds through each gap without being incident on any surface or portion of said optical element.

2. An optical element according to claim 1, wherein the effective optical portion has a rotationally asymmetrical surface shape, and the fixing portion has a planar shape.

3. An optical element according to claim 1, wherein said fixing portion is a fixing portion for fixing said optical element by an adhesive.

4. An optical element according to claim 3, wherein said portion serves also as an escape portion for said adhesive when said optical element is fixed.

5. An optical element, comprising:
   an effective optical portion provided with an effective optical surface on which a light beam is incident; and
   a fixing portion for fixing the effective optical portion by an adhesive,
   wherein the fixing portion has a portion connected to the effective optical portion that forms a groove between the fixing portion and the effective optical portion, wherein the depth of the groove is equal to or less than half of the thickness of the fixing portion and
   wherein the optical element is formed of a molding material.

6. An optical element according to claim 5, wherein said effective optical portion has a rotationally asymmetrical surface shape, and said fixing portion has a planar shape.

7. An optical element according to claim 5, wherein said groove portion serves also as an escape portion for said adhesive when said optical element is fixed.

* * * * *